(12) United States Patent
Tsubamoto et al.

(10) Patent No.: US 8,000,662 B2
(45) Date of Patent: Aug. 16, 2011

(54) TRANSMISSION CHARACTERISTIC ADJUSTMENT DEVICE, CIRCUIT SUBSTRATE, AND TRANSMISSION CHARACTERISTIC ADJUSTMENT METHOD

(75) Inventors: Daita Tsubamoto, Kawasaki (JP);
Makoto Suwada, Kawasaki (JP);
Hitoshi Yokemura, Kawasaki (JP);
Masaki Tosaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 609 days.

(21) Appl. No.: 12/186,043

(22) Filed: Aug. 5, 2008

(65) Prior Publication Data
US 2009/0167452 A1    Jul. 2, 2009

(30) Foreign Application Priority Data
Dec. 26, 2007    (JP) ................ 2007-334547

(51) Int. Cl.
*H04C 1/62*    (2006.01)
(52) U.S. Cl. ............... 455/115.1; 455/67.11; 455/67.16; 455/126; 375/240.01
(58) Field of Classification Search ............. 455/115.1, 455/67.11, 67.16, 126, 104, 123, 272, 276.1; 375/240.01, 271; 340/870.18
See application file for complete search history.

(56) References Cited

U.S. PATENT DOCUMENTS

| 3,806,804 | A | * | 4/1974 | Mills et al. ............... 455/509 |
| 5,717,510 | A | | 2/1998 | Ishikawa et al. ............ 359/161 |
| 6,993,083 | B1 | * | 1/2006 | Shirakata et al. ............ 375/260 |
| 7,020,399 | B1 | * | 3/2006 | Miyata et al. ............... 398/162 |
| 7,123,846 | B2 | | 10/2006 | Tateyama et al. ............ 398/209 |
| 7,199,615 | B2 | * | 4/2007 | Stojanovic et al. ............ 326/82 |
| 7,529,300 | B2 | * | 5/2009 | Richards ............... 375/240.01 |
| 7,555,276 | B2 | * | 6/2009 | Wilcox ............... 455/276.1 |
| 7,733,967 | B2 | * | 6/2010 | Yamazaki ............... 375/260 |
| 7,764,935 | B2 | * | 7/2010 | Pallonen et al. ............ 455/115.1 |
| 2007/0025465 | A1 | * | 2/2007 | Richards ............... 375/271 |
| 2007/0142014 | A1 | * | 6/2007 | Wilcox ............... 455/276.1 |
| 2008/0153433 | A1 | * | 6/2008 | Pallonen et al. ............ 455/90.2 |
| 2009/0028074 | A1 | * | 1/2009 | Knox ............... 370/278 |
| 2009/0274072 | A1 | * | 11/2009 | Knox ............... 370/278 |
| 2010/0225401 | A1 | * | 9/2010 | Hayata et al. ............... 330/295 |

FOREIGN PATENT DOCUMENTS

| JP | 04-017432 | 1/1992 |
| JP | 8-321805 | 12/1996 |
| JP | 2003-32187 | 1/2003 |
| JP | 2004-104440 | 4/2004 |

* cited by examiner

*Primary Examiner* — Minh D Dao
(74) *Attorney, Agent, or Firm* — Staas & Halsey LLP

(57) ABSTRACT

A transmission characteristic adjustment device and the like that can carry out circuit adjustment before an error occurs, and has a transmission characteristic with high reliability without generating an error are provided.
The device determines existence or non-existence of a difference with respect to confirmed data based on each phase of a multiphase clock, detects a window width in a time axis direction of receiving data based on a result of the determination and a phase of the multiphase clock, and evaluates a setting value of a circuit element of the transmission element or the reception element that has an influence on a receiving waveform based on a fluctuation of the detected window width, and changes the setting value of the circuit element of the transmission element or the reception element based on a result of the evaluation.

20 Claims, 18 Drawing Sheets

FIG. 16A
FIG. 16B
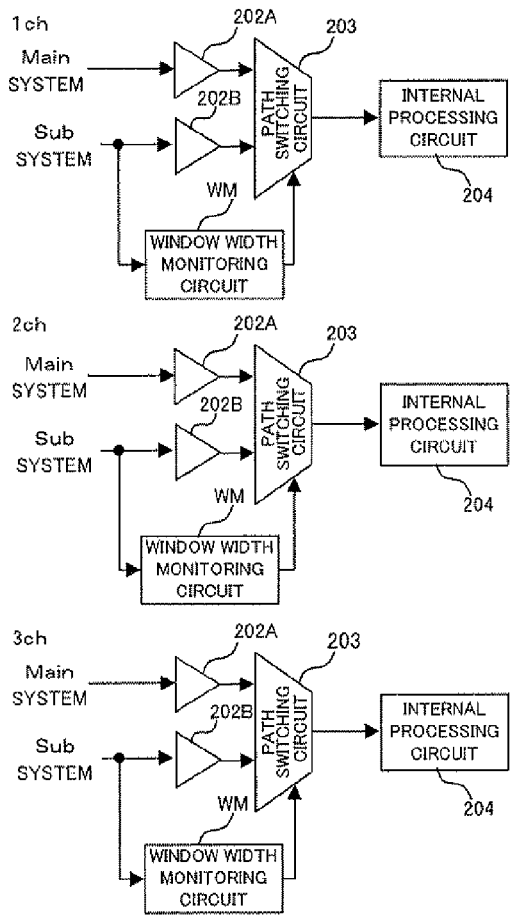
( THE Sub SYSTEM IS INCLUDED IN EACH CHANNEL )
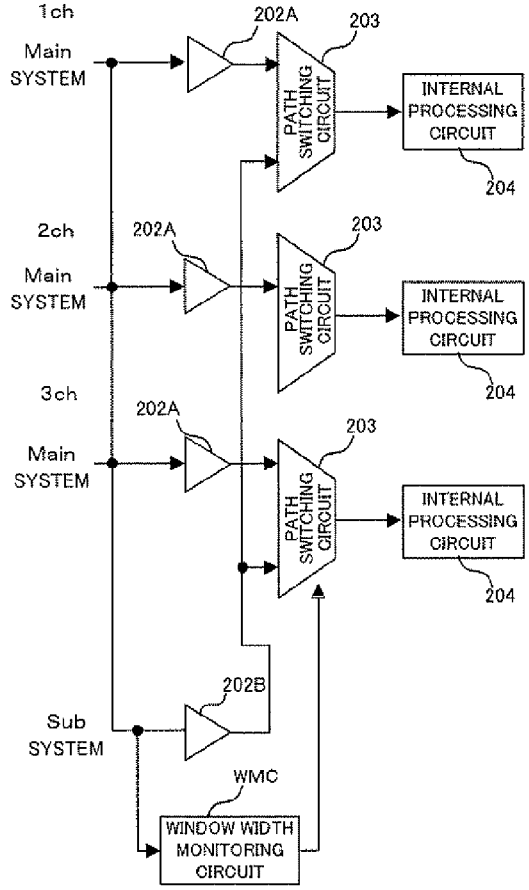
( THE Sub SYSTEM IS SHARED, AND WINDOW WIDTH MONITORING AND CIRCUIT ADJUSTMENT ARE PERFORMED IN THE ORDER OF 1ch-2ch-3ch-1ch IN A TIME DIVISION SYSTEM. )

TRANSMISSION CHARACTERISTIC ADJUSTMENT DEVICE, CIRCUIT SUBSTRATE, AND TRANSMISSION CHARACTERISTIC ADJUSTMENT METHOD

BACKGROUND OF THE INVENTION

1. Field of the Invention

This application claims priority from Japanese Patent Application No. 2007-334547, filed Dec. 26, 2007, the disclosure of which is herein incorporated in its entirety. The present invention relates to a transmission characteristic adjustment device, a circuit substrate, and a transmission characteristic adjustment method that adjust a transmission characteristic between a transmission element and a reception element having a transmission path interposed therebetween. In particular, the present invention relates to a transmission characteristic adjustment device, a circuit substrate, and a transmission characteristic adjustment method that monitor deterioration of waveform quality in an input of a reception element of a signal transmission system with a window width in a time axis direction measured by using a multiphase CLK as an index, and use a result of the monitoring to adjust a transmission characteristic.

2. Description of the Related Art

In recent years, along increase in speed of signal transmission, there is a tendency that a margin thereof (waveform margin) becomes smaller. Accordingly, there has been increased need for sequential adjustment of a transmission characteristic with respect to proper locations on a device, not only in design and evaluation stages.

In contrast, a technique which has been conventionally provided adopts a system that adjusts any circuit element to adjust a transmission characteristic while monitoring an error factor. For example, as a reference document, there is a Patent Document such as Jpn. Pat. Appln. Laid-Open Publication No. 2003-032187.

However, when a circuit element is adjusted while an error factor is monitored, an error factor of a certain degree needs to be tolerated. Accordingly, there has been a problem that the conventional technique can only be applied to a system that can tolerate an error factor of a certain degree.

SUMMARY OF THE INVENTION

The present invention has been made in order to solve the problem described above. An object of the present invention is to provide a transmission characteristic adjustment device with high reliability in a transmission characteristic that can adjust a circuit before an error occurs and never generates an error, a circuit substrate incorporating such a transmission characteristic adjustment device, and a transmission characteristic adjustment method.

In order to achieve the object described above, according to an aspect of the present invention, there is provided a transmission characteristic adjustment device that adjusts a transmission characteristic between a transmission element and a reception element with a transmission path interposed therebetween. The transmission characteristic adjustment device includes a determination section that determines existence or non-existence of a difference with respect to confirmed data based on each phase of a multiphase clock. Also, the transmission characteristic adjustment device includes a window detection section that detects a window width in a time axis direction of receiving data based on a result of determination of the determination section and a phase of the multiphase clock. Further, the transmission characteristic adjustment device includes a circuit element setting section that evaluates a setting value of a circuit element of the transmission element or the reception element that has an influence on a receiving waveform based on a fluctuation of the window width detected by the window detection section, and changes the setting value of the circuit element of the transmission element or the reception element based on a result of the evaluation.

In addition, according to an aspect of the present invention, there is provided a circuit substrate having a transmission characteristic adjustment device that adjusts a transmission characteristic between a transmission element and a reception element with a transmission path interposed therebetween. The transmission characteristic adjustment device includes a determination section that determines existence or non-existence of a difference with respect to confirmed data based on each phase of a multiphase clock. Also, the transmission characteristic adjustment device includes a window detection section that detects a window width in a time axis direction of receiving data based on a result of determination of the determination section and a phase of the multiphase clock. Further, the transmission characteristic adjustment device includes a circuit element setting section that evaluates a setting value of a circuit element of the transmission element or the reception element that has an influence on a receiving waveform based on a fluctuation of the window width detected by the window detection section, and changes the setting value of the circuit element of the transmission element or the reception element based on a result of the evaluation.

Further, according to an aspect of the present invention, there is provided a transmission characteristic adjustment method that adjusts a transmission characteristic between a transmission element and a reception element with a transmission path interposed therebetween. The transmission characteristic adjustment method determines existence or non-existence of a difference with respect to confirmed data based on each phase of a multiphase clock. Also, the transmission characteristic adjustment method detects a window width in a time axis direction of receiving data based on a result of the determination and a phase of the multiphase clock. Further, the transmission characteristic adjustment method evaluates a setting value of a circuit element of the transmission element or the reception element that has an influence on a receiving waveform based on a fluctuation of the detected window width, and changes the setting value of the circuit element of the transmission element or the reception element based on a result of the determination.

According to the present invention, evaluation of setting can be carried out based on a fluctuation of a detected window width in a time axis direction, and a transmission characteristic can be adjusted depending on a result of the evaluation. Accordingly, an advantageous effect that transmission with high reliability can always be carried out can be achieved.

BRIEF DESCRIPTION OF THE DRAWINGS

FIGS. 16A and 16B are block diagrams showing sharing of a time axis window width monitoring system in a fifth embodiment;

DETAILED DESCRIPTION OF THE PREFERRED EMBODIMENTS

Hereinafter, an embodiment of the present invention will be described with reference to the accompanying drawings.

First Embodiment

Figure 1:
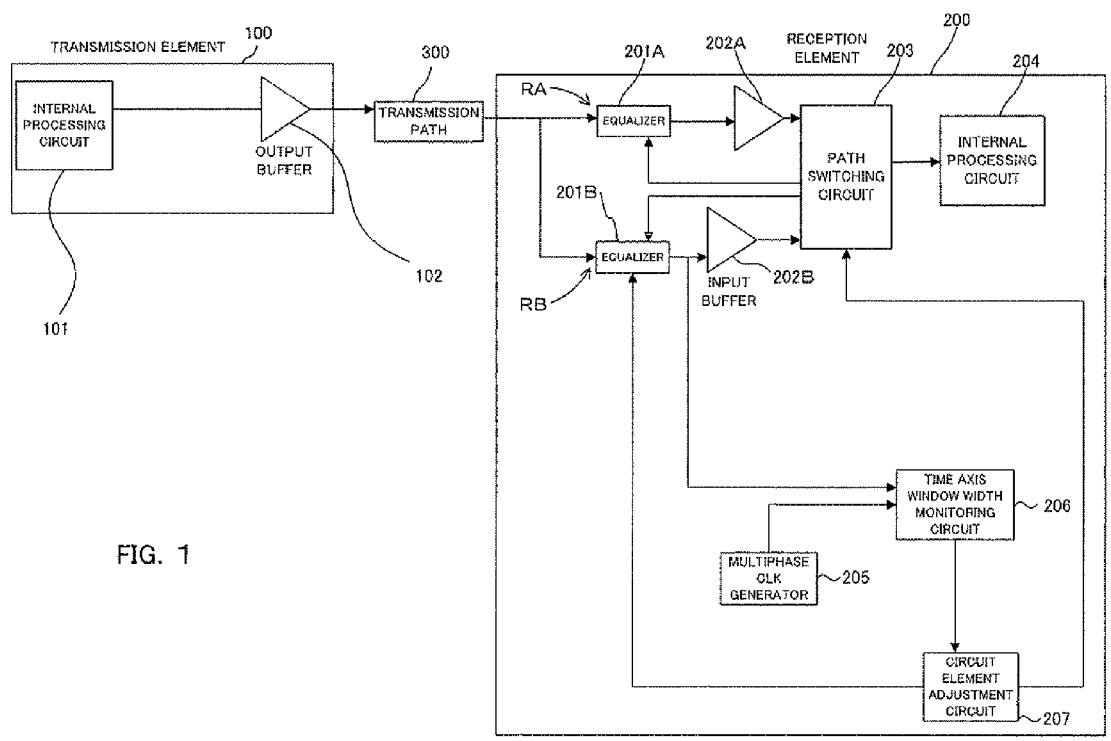
FIG. 1 is a block diagram showing a first embodiment of the present invention.

FIG. 1 is a block diagram showing an entire structure of a first embodiment of the present invention. The embodiment includes a transmission element 100, a reception element 200, and a transmission path 300 that is provided between the transmission element 100 and the reception element 200.

The transmission element 100 includes an internal processing circuit 101 and an output buffer 102 that outputs a result of processing of the internal processing circuit 101 to the transmission path.

In addition, the reception element 200 includes receiving systems RA and RB, a path switching circuit 203, and an internal processing circuit 204. The RA and RB include equalizers 201A and 201B and input buffers 202A and 202B.

Then, the receiving system RB, which is one of the two receiving systems RA and RB, includes a multiphase clock generator 205, a time axis window width monitoring circuit (time axis window width detection section) 206, and a circuit element adjustment circuit (circuit element adjustment section) 207. The multiphase clock generator 205 generates a multiphase clock. The time axis window width monitoring circuit 206 detects a time axis window width. The circuit element adjustment circuit 207 detects a fluctuation of the window width detected by the time axis window width monitoring circuit 206, evaluates a setting value of a circuit element (the equalizer 201B in this case) that has an influence on a window width, and adjusts the equalizer 201B (the setting value of a circuit element) based on a result of the evaluation.

Hereinafter, detailed description of the above will be made. The transmission path 300 is a line that connects the transmission element 100 and the reception element 200. More specifically, the transmission path 300 is made of a printed wiring substrate, a cable, and the like.

The equalizers 201A and 201B are circuits that compensate a high frequency component lost in the transmission path from the reception element 200 side.

The multiphase clock generator 205 generates a CLK that is obtained by fluctuating a phase by a time width that is obtained by dividing one cycle by any number.

The time axis window width monitoring circuit 206 measures a window width on a time axis by confirming input data by a CLK of each phase that is supplied from a multiphase CLK, and recognizing a section where logic of adjacent phases is different as a data change point. The time axis window width monitoring circuit 206 may be configured to measure a window width and monitor a fluctuation of the window width.

The circuit element adjustment circuit 207 detects a fluctuation of a window width measured by the time axis window width monitoring circuit 206, and evaluates a setting value of the equalizer 201B based on the fluctuation. Then, the circuit element adjustment circuit 207 changes and adjusts a setting value of the equalizer 201B based on a result of the evaluation. The above adjustment is carried out so that a width of a time axis window becomes maximum. In the present embodiment, the circuit element adjustment circuit 207 is provided with a function of detecting a fluctuation of a window width. However, as described above, the function may be provided in the time axis window width monitoring circuit 206.

Figure 2:
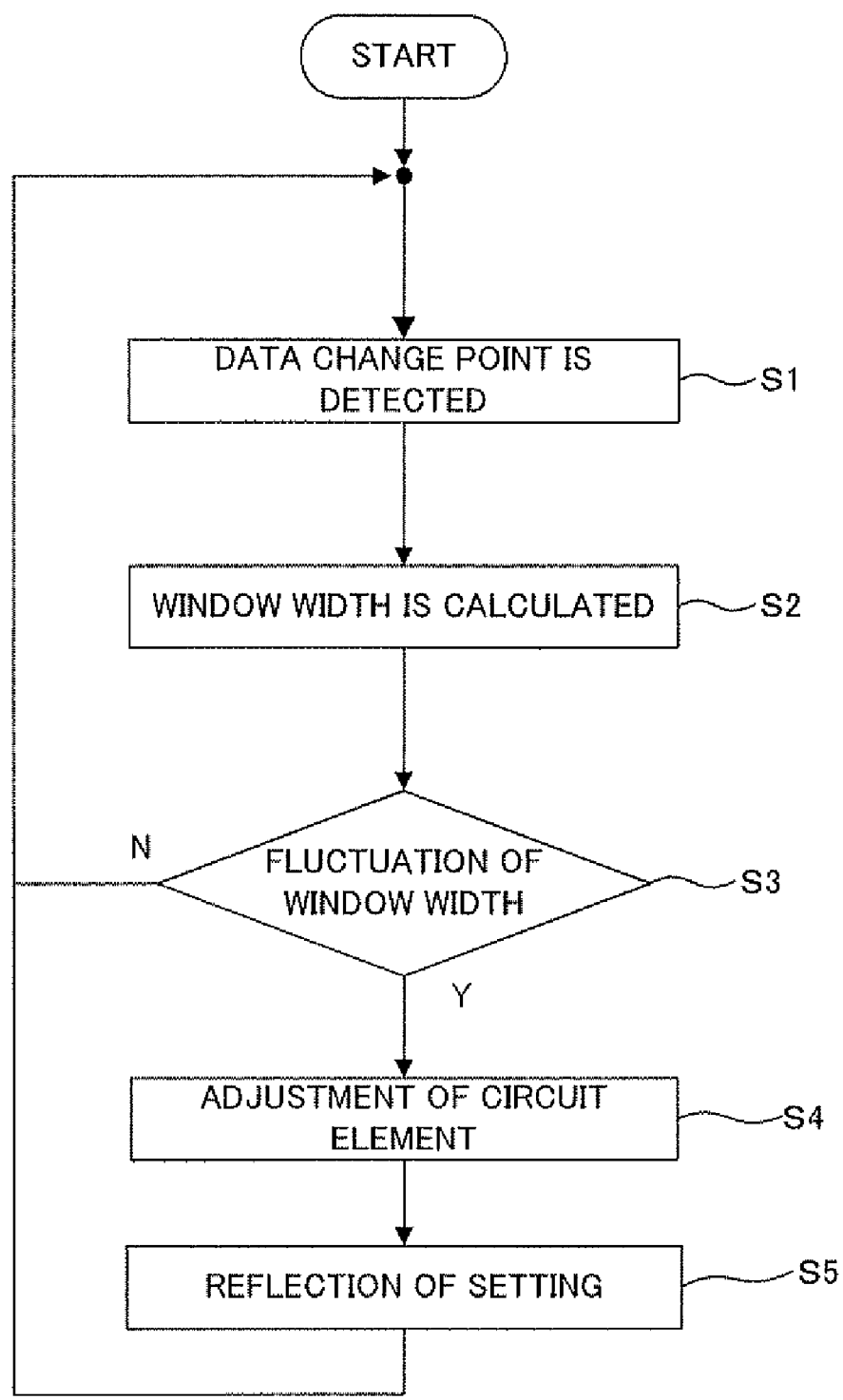
FIG. 2 is a flowchart showing entire operation of the first embodiment of the present invention.

Hereinafter, description will be made with respect to entire operation of the embodiment 1 by using a flowchart of FIG. 2.
(Detection of Data Change Point: S1)

Figure 3:
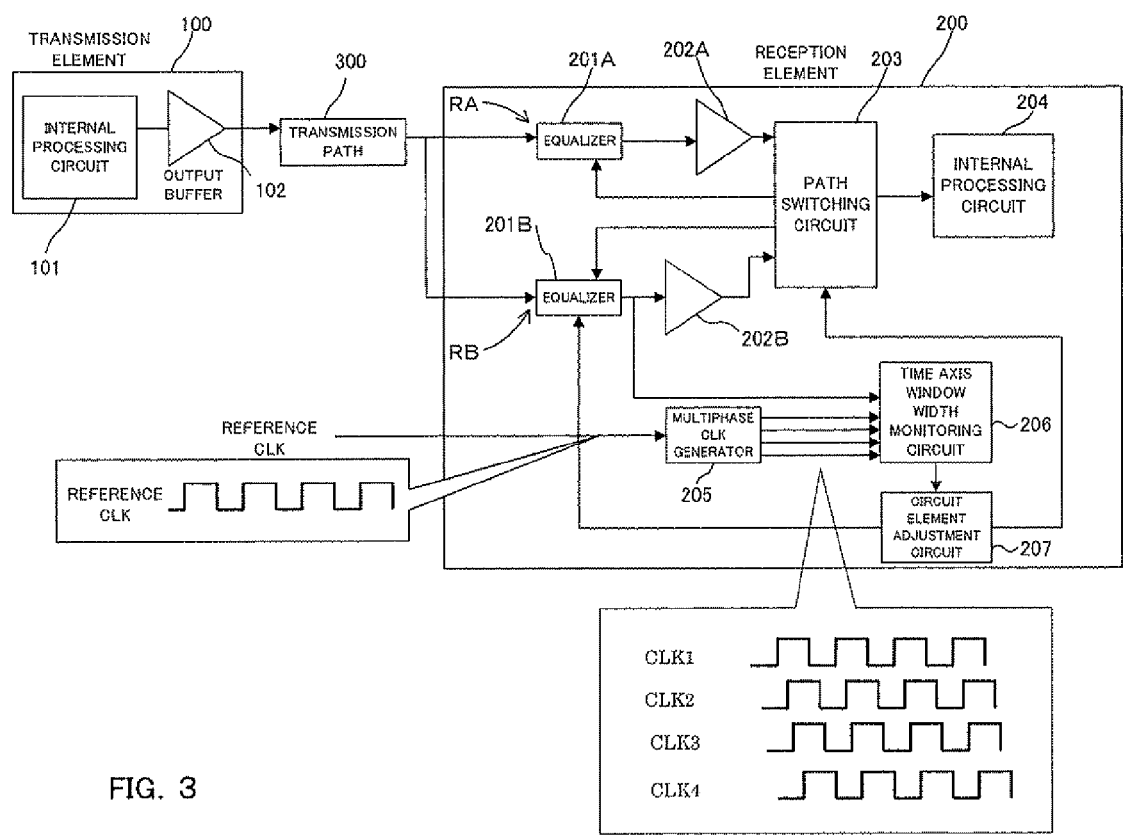
FIG. 3 is a conceptual view for explaining generation of a multiphase clock.
Figure 4:
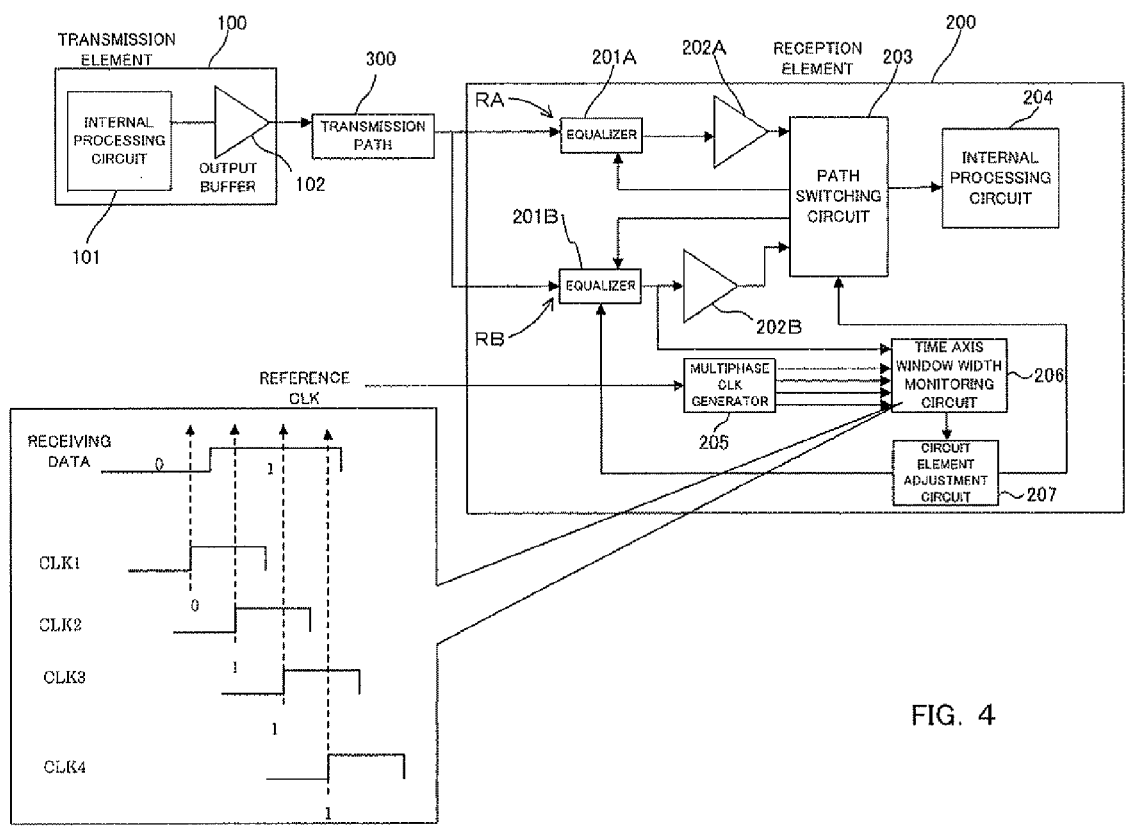
FIG. 4 is a conceptual view showing logic confirmation operation in each phase clock.
Figure 5:
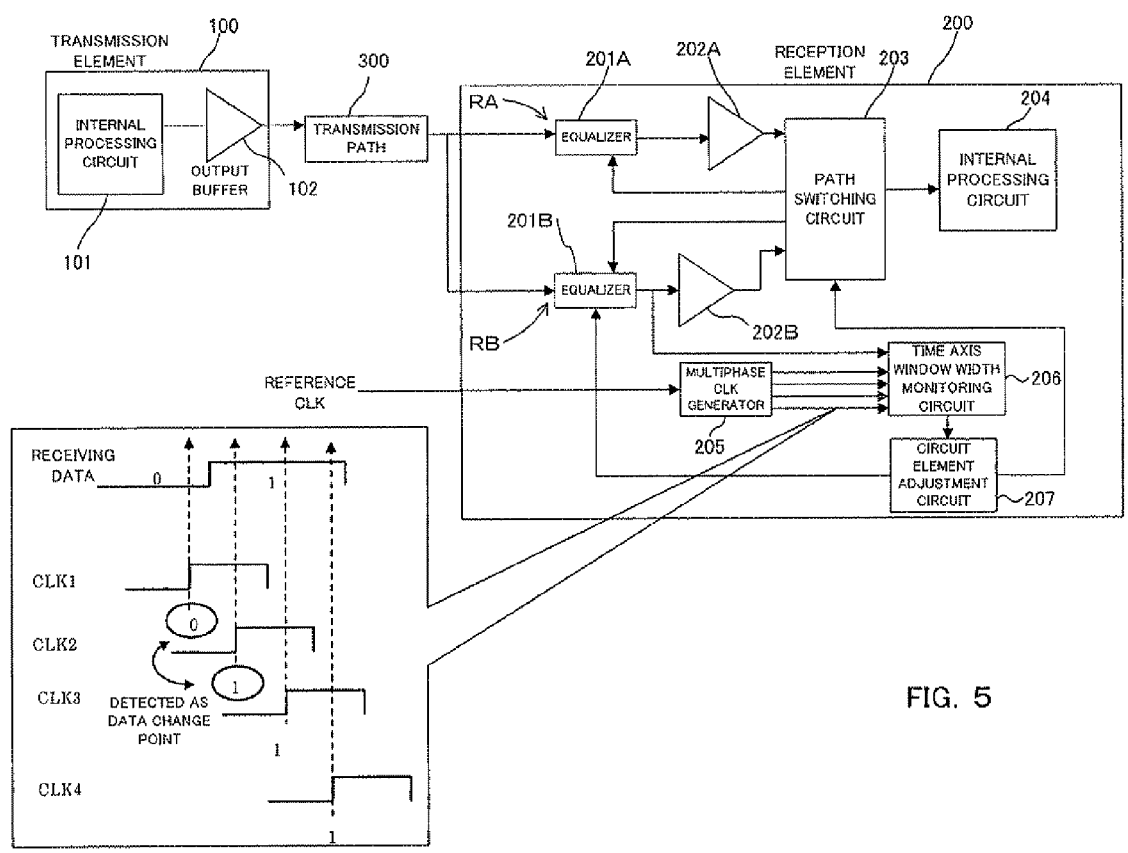
FIG. 5 is a conceptual view showing operation of detecting a change of a logic value between adjacent phases.

A system of detecting a data change point is a system that is adopted by a general clock recovery circuit. A specific process will be described below.
(First Step) Generation of a Multiphase Clock As shown in FIG. 3, a clock in which a phase is shifted only for a certain value is generated based on a clock signal which is input from the outside or a clock signal included internally as a reference. The number of clocks to be generated is the number obtained by dividing a cycle of a clock by a phase shift value.
(Second Step) Logic Confirmation in Each Phase Clock As shown in FIG. 4, receiving data is confirmed by each of the multiphase clock generated in the above section (the first step).
(Third Step) Detection of a Section where Logic is Different Between Adjacent Phases As shown in FIG. 5, the logic confirmed in the above section (the second step) is checked, and a section where logic is different between adjacent phases is detected. In an example of FIG. 5, the section corresponds to a section between "CLK1" and "CLK2". This section is regarded as a change point of data. At this time, extraction of a change point is carried out by obtaining an average value of change points in the data of a plurality of bits.
(Calculation of Time Axis Window Width: S2)

Figure 6:
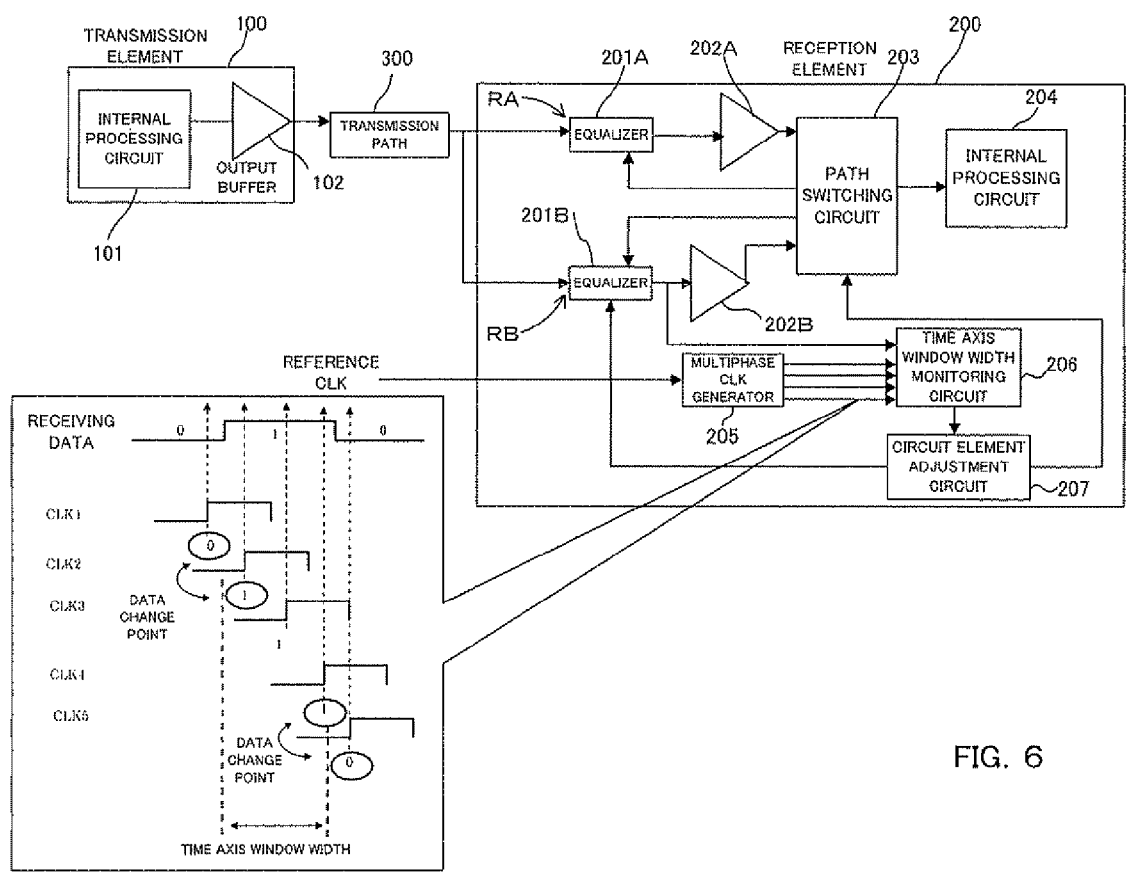
FIG. 6 is a conceptual view showing calculation operation of a time axis window width.

As shown in FIG. 6, data change points are detected and a time interval between the detected data change points is measured by the method (S1) described above. In this manner, a time axis window width can be obtained.
(Monitoring of Fluctuation of Time Axis Window Width: S3)

Figure 7:
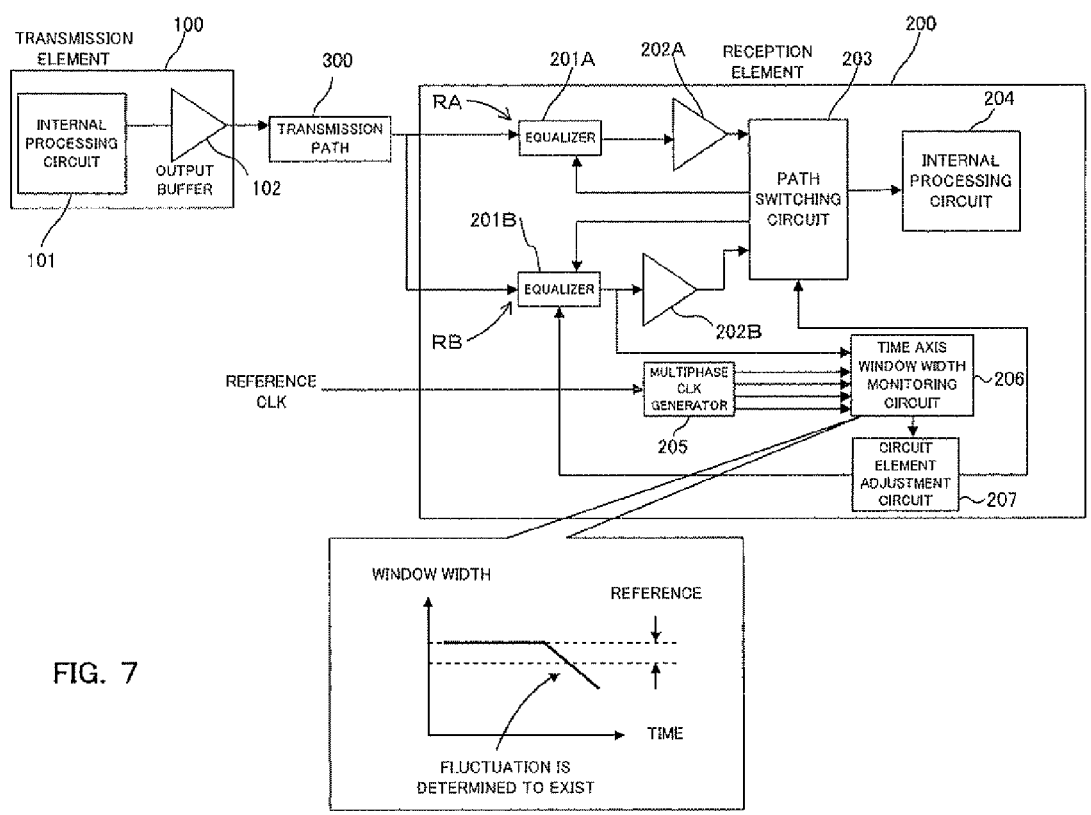
FIG. 7 is a conceptual view showing operation of monitoring fluctuation of a time axis window width.

As shown in FIG. 7, the time axis window width monitoring circuit 206 monitors a window width in a certain cycle. In case there is a fluctuation in the window width (S3, Y), the processing moves to adjustment of a circuit element (S4). When there is no fluctuation (S3, N), the processing returns to Step S1. The monitoring of a window width is realized by setting any reference value with respect to a difference from a previous measurement.

(Adjustment of Circuit Element: S4)

Figure 8:
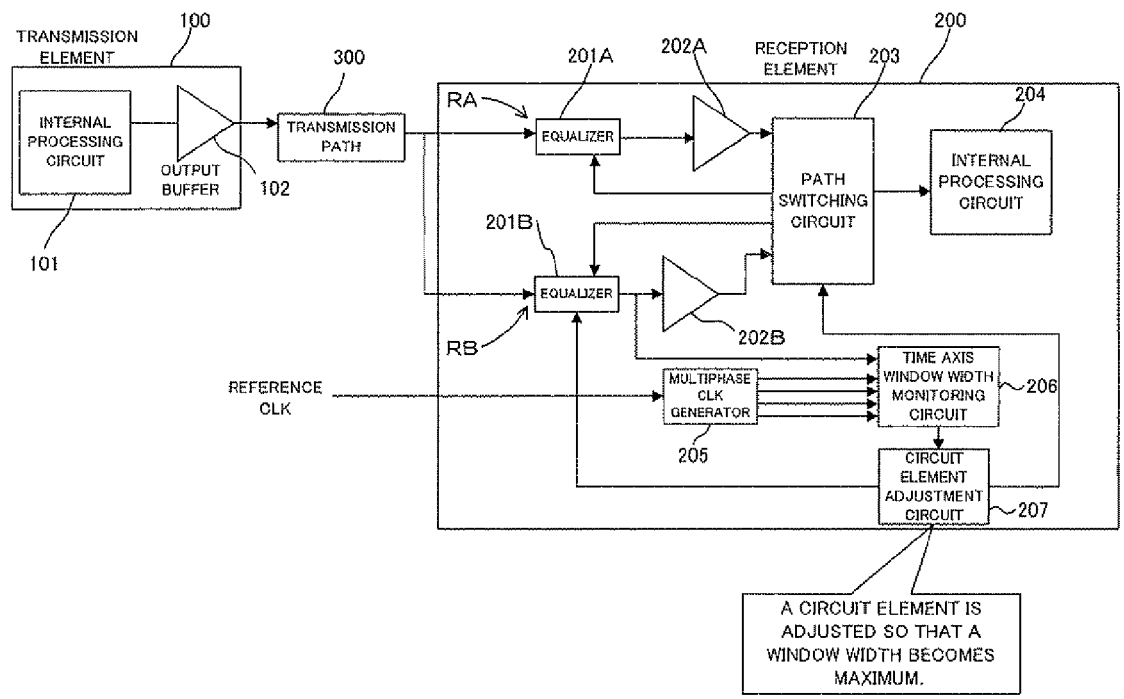
FIG. 8 is a conceptual view showing adjustment operation of a circuit operation.
Figure 9:
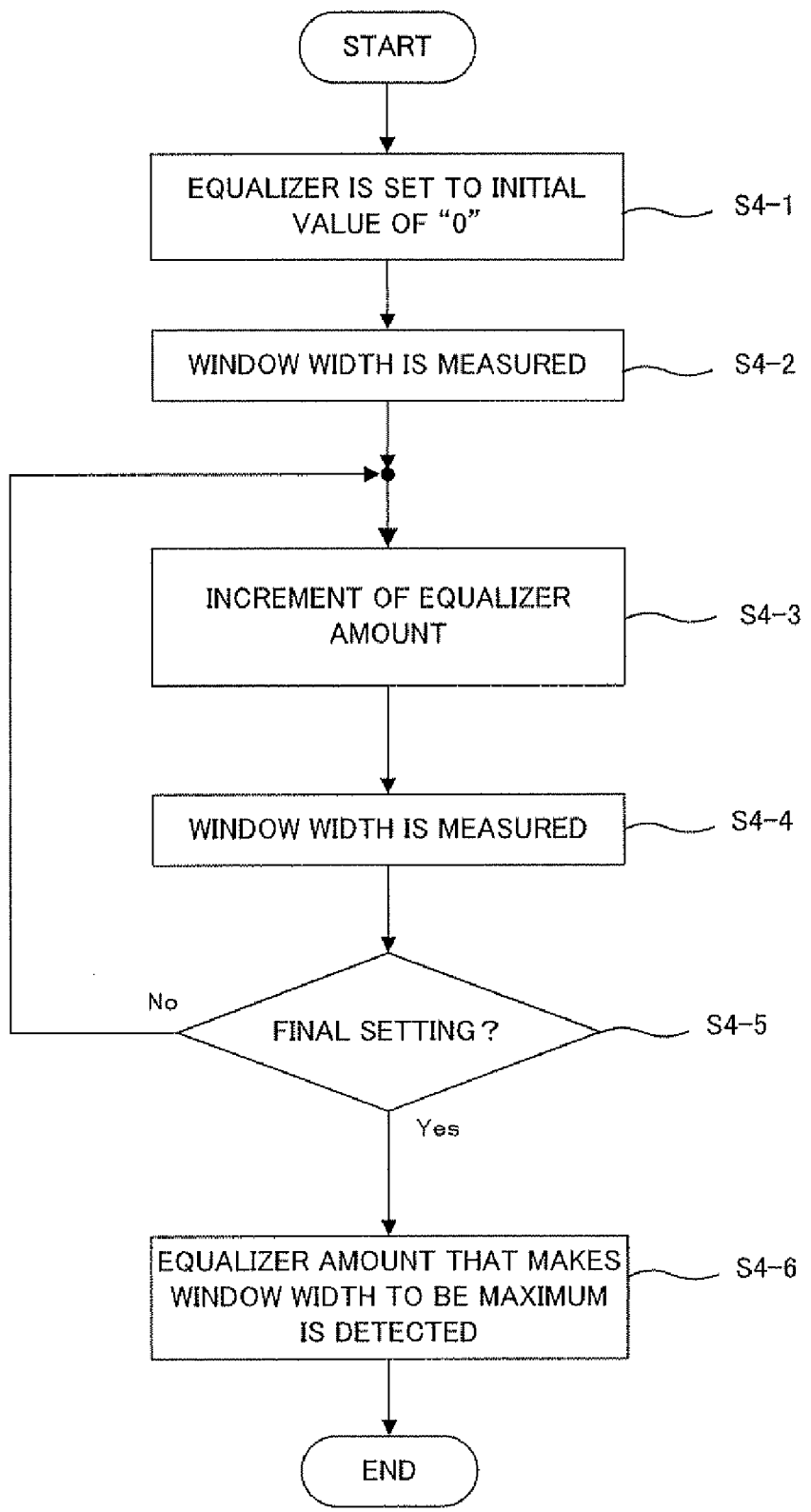
FIG. 9 is a flowchart showing the adjustment operation of a circuit operation.

Adjustment of a circuit element is carried out by steps described below. FIG. 8 is a block diagram showing an outline of operation. FIG. 9 is a flowchart showing operation of adjusting a circuit element.

Setting of an amplification amount (hereinafter represented as the equalizer amount) with respect to a high frequency component of an equalizer circuit is set to an initial value of "0" (S4-1). Then, a time axis window width is measured (S4-2). Next, setting of the equalizer amount is changed to a next stage in an increasing direction (S4-3). Then, a time axis window width is measured (S4-4).

The processing of the above steps (S4-3) and (S4-4) is applied to all setting values (S4-5). Then, setting in which a window width becomes maximum is detected, and the detected setting is set as an adopted value (S4-6).

(Reflection of Setting: S5)

The setting detected in the above section (S4) is reflected to a circuit.

At this time, the circuit needs to be controlled so that there is no error generated along the change of setting. This function is included in a path switching circuit included in an operation conceptual view shown in FIG. 10. Specific steps will be described in accordance with FIG. 11.

Figure 10:
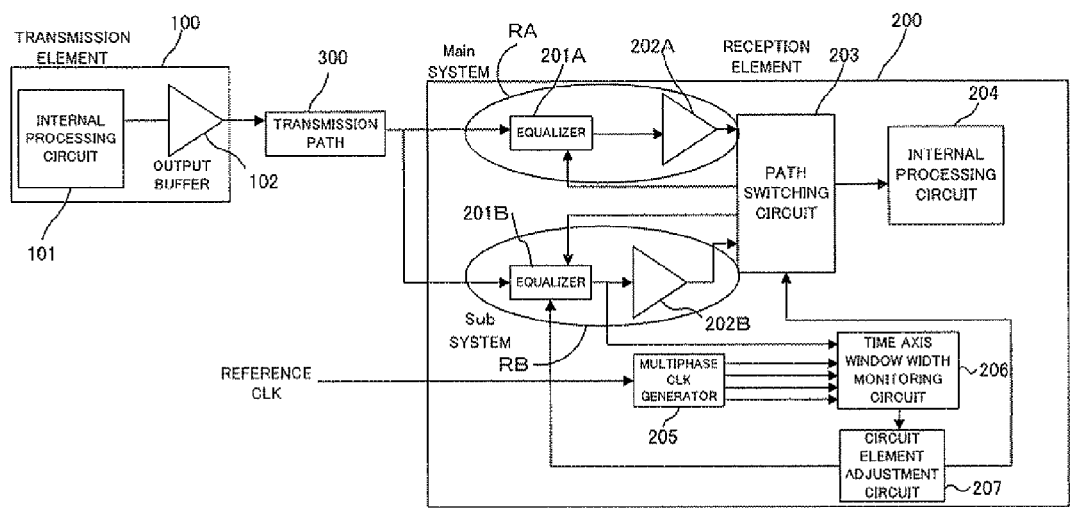
FIG. 10 is a conceptual view showing operation of reflecting an adjusted setting value.
Figure 11:
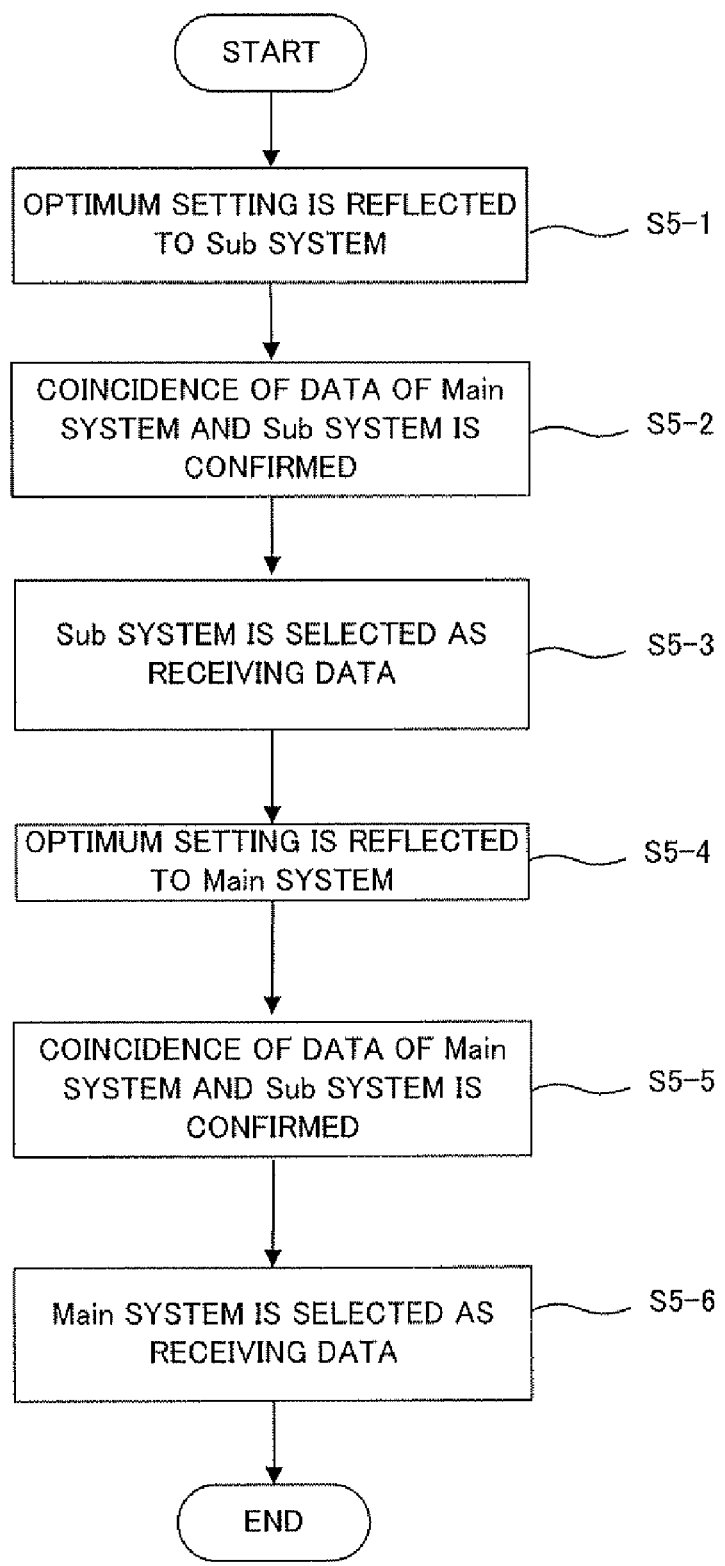
FIG. 11 is a flowchart showing path switching operation.

First, the extracted setting is reflected to a Sub system RB shown in FIG. 10 (S5-1). Next, settlement of an error generated at the time of switching setting of the Sub system is detected by difference (matching) of receiving data of the Sub system and a Main system (S5-2). As a specific example of a circuit for checking the difference of the data, there is use of exclusive OR. In order to check the difference of the data, monitoring of around several milliseconds is necessary. That time required for the monitoring is equivalent to how many multiples of the transmission and receiving data is calculated. Then, by measuring a result of the calculation by a counter, desired time for monitoring the matching (difference) is obtained. An example of the circuit structure is shown in FIG. 12.

Figure 12:
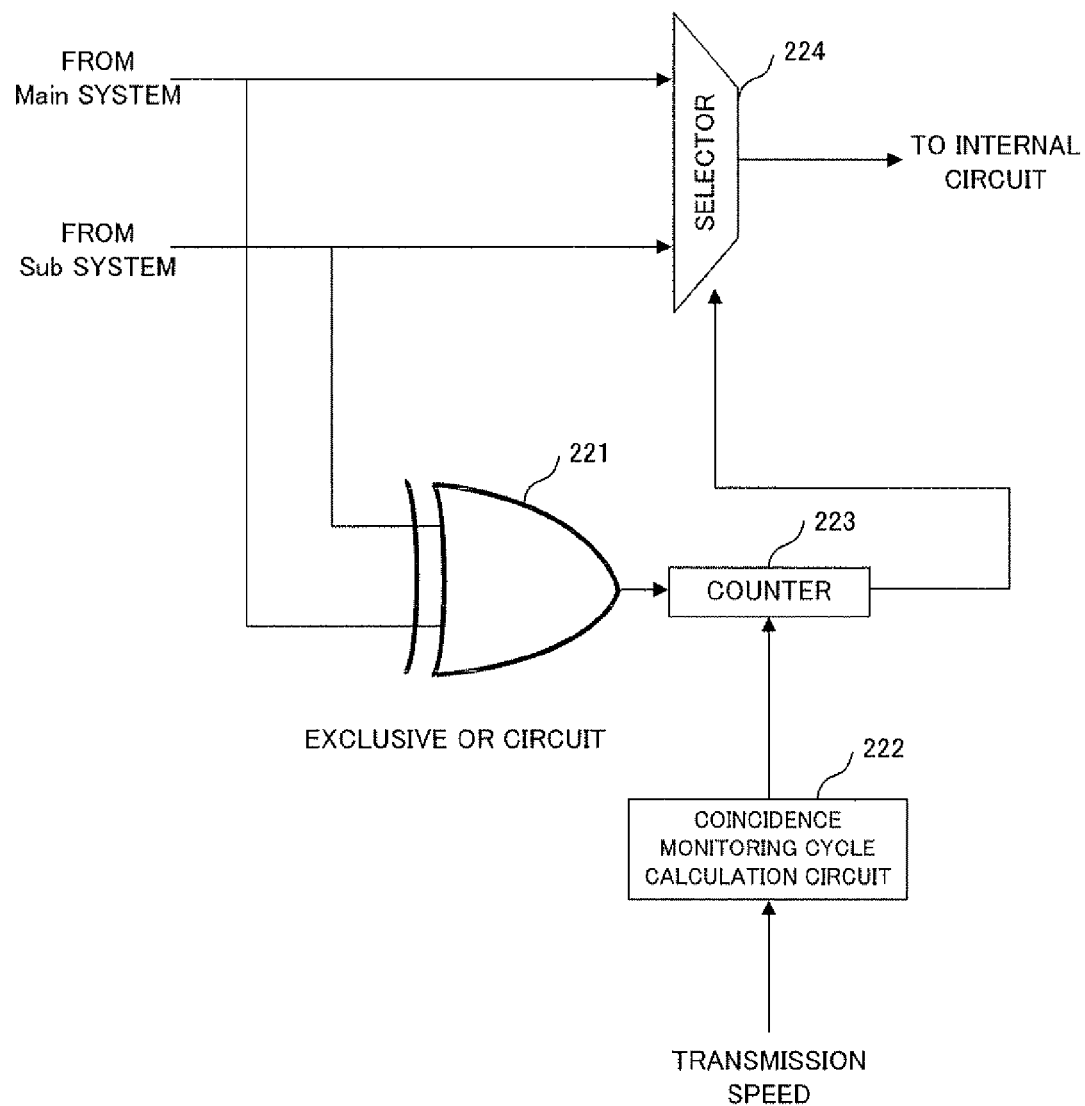
FIG. 12 is a block diagram showing a coincidence (difference) monitoring circuit of data.

FIG. 12 shows an exclusive OR circuit 221, a cycle calculation circuit 222, a counter 223, and a selector 224. The exclusive OR circuit 221 inputs receiving data of the Main system and the Sub system. The cycle calculation circuit 222 monitors coincidence of outputs of the exclusive OR circuit 221. The counter 223 carries out counting for a cycle instructed by the cycle calculation circuit 222. The selector 224 switches the Main system and the Sub system based on a count value of the counter 223.

Then, when the coincidence of the Main system and the Sub system is confirmed (S5-2), the Sub system is selected as the receiving data (S5-3). Then, setting of the Sub system is reflected to the Main system (S5-4). Then, when settlement of an error at the time of switching setting of the Main system is confirmed by the coincidence of the receiving data of the Sub system and the Main system (S5-5), the Main system is selected as the receiving data (S5-6).

Second Embodiment

In the first embodiment, an equalizer is adopted as a circuit element adjusted by a circuit element, that is, the circuit element adjustment circuit 207, which controls a transfer characteristic. A similar advantageous effect can be obtained by controlling the transmission element 100 and the reception element 200.

Figure 13:
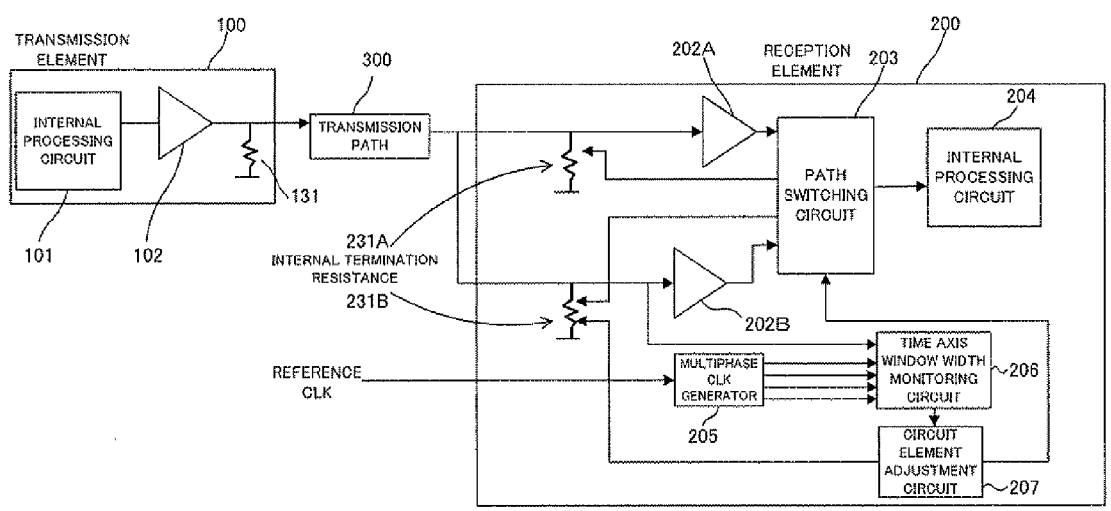
FIG. 13 is a conceptual view showing adjusting operation of control of an internal termination resistance in a second embodiment.

For example, as shown in FIG. 13, in the second embodiment, changes of values of internal termination resistances 131, 231A, and 231B provided on an output side of the output buffer 102 of the transmission element 100 and input sides of the input buffers 202A and 202B of the reception element 200 which are both sides of the transmission path are controlled. In this manner, an advantageous effect that is similar to that of the first embodiment can be obtained.

Third Embodiment

In addition, in a third embodiment, as setting of a circuit element, a transmission system of a transmission element 100A can be made redundant. In the first embodiment described above, a redundant circuit is configured only with the reception element side. Accordingly, a circuit element on the transmission side cannot be adjusted.

Figure 14:
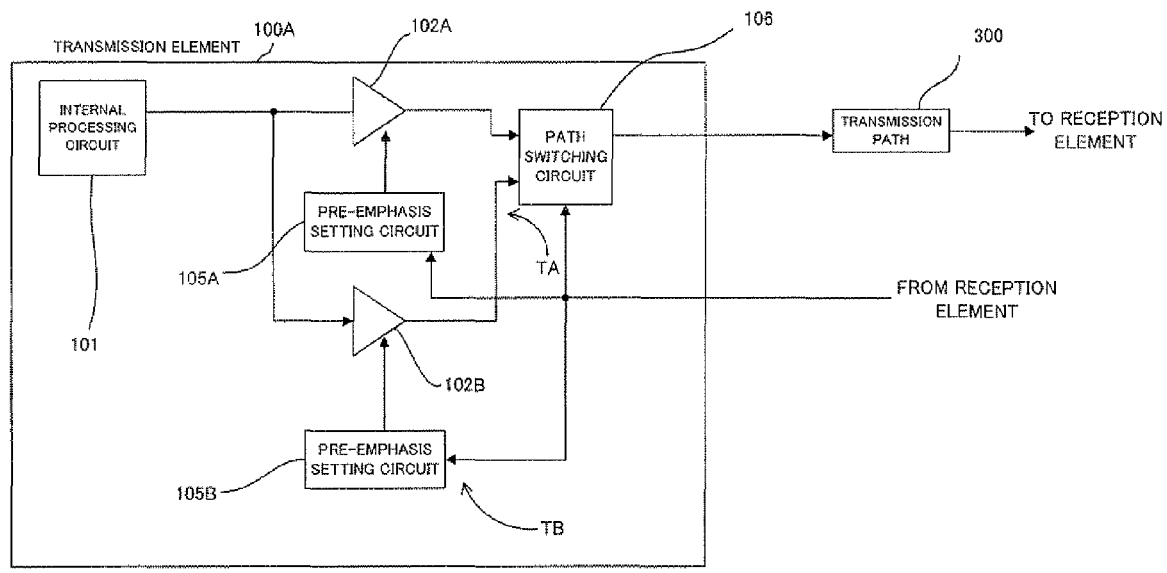
FIG. 14 is a block diagram showing redundancy of a transmission element in a third embodiment.

In view of the above, as shown in FIG. 14, the data transmission system in the transmission element 100A is included redundantly In this manner, a similar advantageous effect can be obtained by adjusting a transmission characteristic by switching a pre-emphasis amount, an amplitude, and a data transmission system by a control signal transmitted from the reception element side.

In FIG. 14, a plurality (two) of data transmission systems TA and TB are included in the transmission element. Also, each of the data transmission systems TA and TB includes output buffers 102A and 102B and pre-emphasis setting circuits 105A and 105B. Then, the transmission element 100A includes a path switching circuit 106 that switches the above transmission systems by a control signal from the circuit element adjustment circuit 207 on the reception element 200 side.

Fourth Embodiment

Figure 15A:
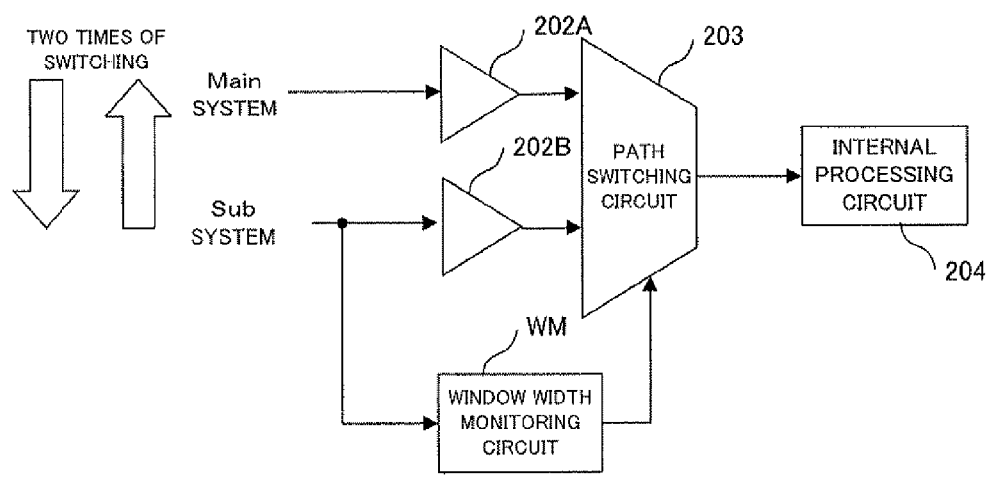
FIGS. 15A and 15B are block diagrams showing duplication of a signal transmission system in a fourth embodiment.
Figure 15B:
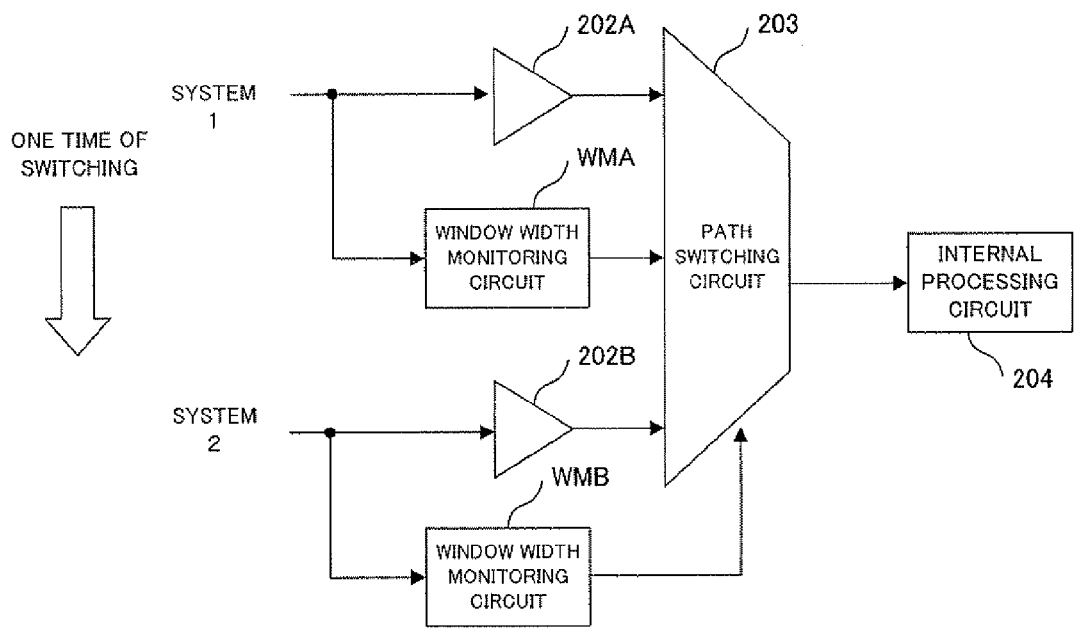

In the first embodiment, the signal transmission system is divided into two systems (Main and Sub), and a function of adjusting a circuit element is included in the Sub side. According to the above configuration, when setting is switched, steps of Main-Sub-Main in this order are necessary as shown in FIG. 15A. Accordingly, two times of switching are necessary. In contrast, as shown in FIG. 15B, duplication of the signal transmission system is made in a completely symmetrical form. In this manner, there is no longer distinction of the Main and the Sub, and switching of circuits can be reduced to one time, that is, a signal transmission system (1) to a signal transmission system (2).

Fifth Embodiment

In the first embodiment, as shown in FIG. 16A, the Sub system including a window width monitoring system is included in each channel. In the fifth embodiment, the Sub system is shared by a plurality of data transmission system as shown in FIG. 16B. In this manner, circuit scale can be reduced. The above sharing is in a time division system.

Sixth Embodiment

Figure 17A:
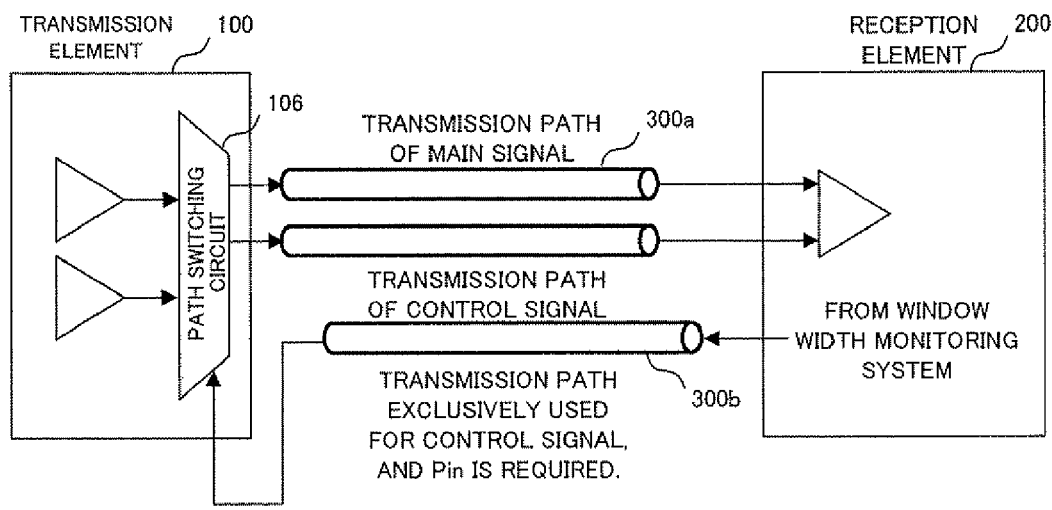
FIGS. 17A and 17B are conceptual views showing superposing of a control signal on a main signal transmission system in a sixth embodiment.

In the third embodiment, the description was made with respect to redundancy of the transmission element. As shown in FIG. 17A, in the third embodiment, a transmission path 300b for sending a control signal from the reception element to the transmission element is added as a means for controlling the circuit element on the transmission element side, separately from a transmission path 300a of a main signal.

For this reason, a signal Pin for exclusive use needs to be prepared for the transmission element, the reception element, and a connector. This causes deterioration in implementation efficiency.

Figure 17B:
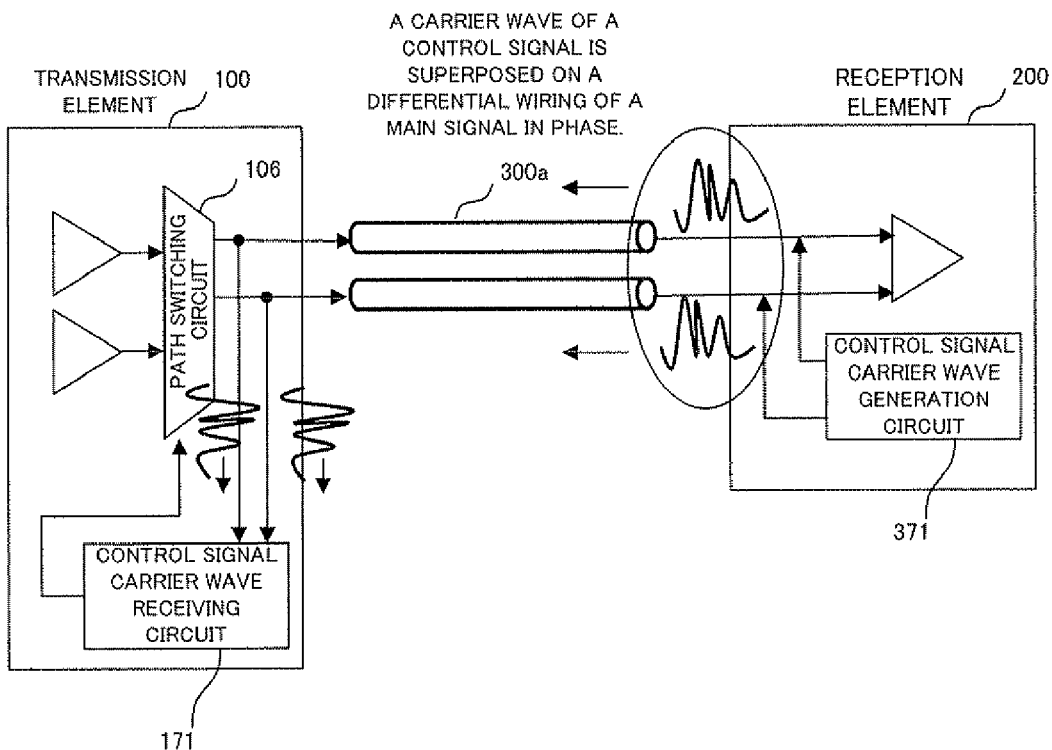

In contrast, as shown in FIG. 17B, a control signal carrier wave generation circuit 371 that generates a control signal carrier wave and superposes the control signal carrier wave on a wiring of the main signal is provided in the reception element 200. Also, a control signal carrier wave receiving circuit 171 that receives the control signal carrier wave superposed on the main signal is provided in the transmission element 100. Then, the control signal from the reception element 200 side is transmitted in a manner superposing on a differential data transmission system in phase. In this manner, transmission of the control signal to the transmission element can be realized without causing any influence on the transmission and receiving data and without adding a transmission path for the control signal.

Seventh Embodiment

Figure 18A:
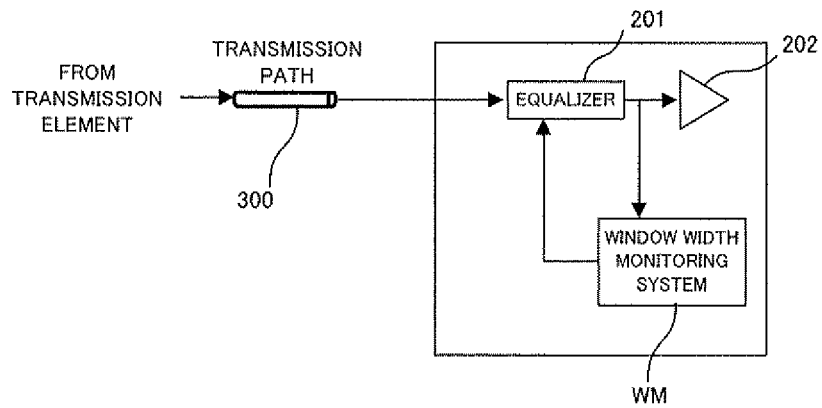
FIGS. 18A and 18B are block diagrams showing adjustment operation of a power source filter constant in a seventh embodiment.
Figure 18B:
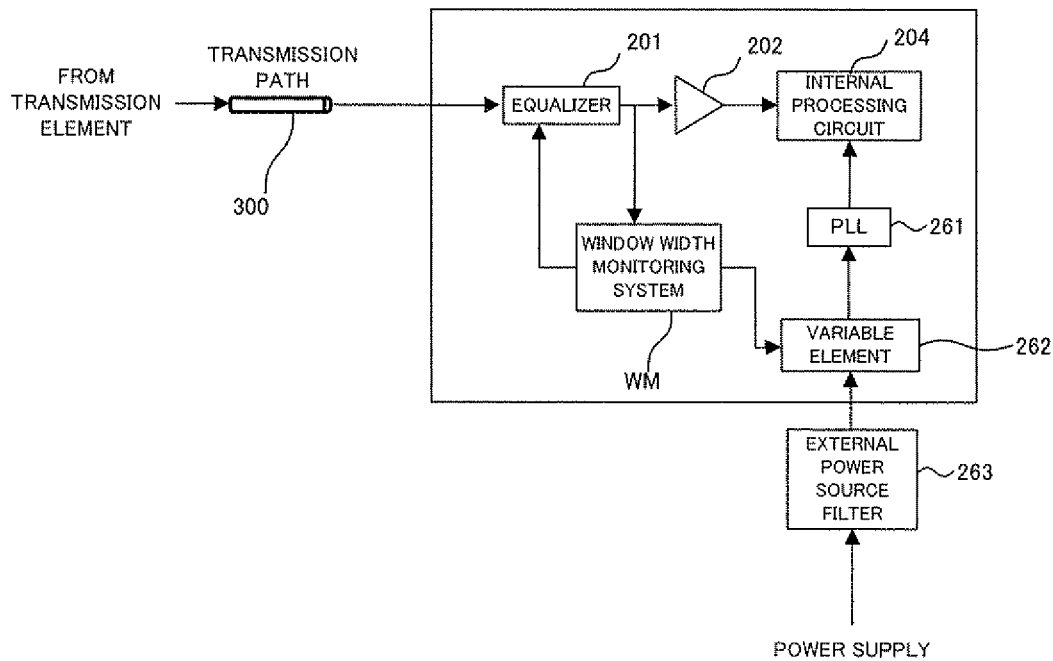

As shown in FIG. 18A, the first embodiment adopts an equalizer as the circuit element that controls a transmission characteristic. Alternatively, a similar advantageous effect can also be obtained by controlling a constant of circuit components (an inductance, a condenser, and a resistance of a variable constant) that configure a power filter of a power source that supplies power to a PLL 261 of the reception element 200 or the transmission element 100, a shown in FIG. 18B. In the seventh embodiment, a jitter frequency resistance is adjusted in the above manner.

When an error due to a jitter is generated in a signal transmission system, a jitter frequency causing the error is often limited. Then, the jitter is often generated by noise that is trapped in a power supply system of the PLL 261. Therefore, a variable element (a condenser, or an inductance) 262 is included in the inside of a power supply terminal to the PLL 261. Then, a characteristic of a filter that is determined by composition of the internal element and an external power source filter (a filter circuit) 263 prepared externally is changed. In this manner, the jitter causing the error can be restricted.

As described above, according to the present invention, adjustment of a transfer characteristic can be attempted while a result is being checked. Also, since measurement of a margin is configured with a digital circuit, application to an LSI is facilitated. Accordingly, an advantageous effect that the present invention can contribute to improvement in quality of signal transfer can be achieved.

As described above, according to the present embodiment, adjustment of a transfer characteristic can be attempted while a result is being checked. Also, since measurement of a time axis window width is configured with a digital circuit, application to an LSI is facilitated. Accordingly, an advantageous effect that the present invention can contribute to improvement in quality of signal transfer can be achieved.

What is claimed is:

1. A transmission characteristic adjustment device that adjusts a transmission characteristic between a transmission element and a reception element with a transmission path interposed therebetween, the device comprising:
a determination section that determines existence or non-existence of a difference with respect to confirmed data based on each phase of a multiphase clock;
a window detection section that detects a window width in a time axis direction of receiving data based on a result of determination of the determination section and a phase of the multiphase clock; and
a circuit element setting section that evaluates a setting value of a circuit element of the transmission element or the reception element that has an influence on a receiving waveform based on a fluctuation of the window width detected by the window detection section, and changes the setting value of the circuit element of the transmission element or the reception element based on a result of the evaluation.

2. The transmission characteristic adjustment device according to claim 1, wherein
the circuit element setting section adjusts a transmission characteristic by changing an internal termination resistance provided at a termination of the transmission path.

3. The transmission characteristic adjustment device according to claim 1, wherein
the reception element comprises a plurality of data receiving systems; and
the circuit element setting section adjusts a transmission characteristic by switching the data receiving systems based on a result of the evaluation.

4. The transmission characteristic adjustment device according to claim 1, wherein
the transmission element comprises a plurality of data transmission systems, and
the circuit element setting section adjusts a transmission characteristic by switching the plurality of data transmission systems based on a result of the evaluation.

5. The transmission characteristic adjustment device according to claim 4, wherein
the circuit element setting section modulates a control signal for setting to be transmitted to the transmission element side, and transmits the control signal in a manner superposing on a differential data transmission system in phase.

6. The transmission characteristic adjustment device according to claim 1, wherein
the transmission characteristic adjustment device is provided in each of a plurality of receiving systems provided in the reception element.

7. The transmission characteristic adjustment device according to claim 1, wherein
the window detection section and the circuit element setting section are provided in a manner shared by a plurality of receiving systems provided in the reception element.

8. The transmission characteristic adjustment device according to claim 1, wherein
the circuit element setting section changes at least any one constant of an inductance, a capacitor, and a resistance that configure a power source filter of a power source that supplies power to a PLL of the transmission element or the reception element, thereby adjusting a jitter frequency resistance.

9. A circuit substrate having a transmission characteristic adjustment device that adjusts a transmission characteristic between a transmission element and a reception element with a transmission path interposed therebetween, wherein
the transmission characteristic adjustment device comprises:
a determination section that determines existence or non-existence of a difference with respect to confirmed data based on each phase of a multiphase clock;
a window detection section that detects a window width in a time axis direction of receiving data based on a result of determination of the determination section and a phase of the multiphase clock; and a circuit element setting section that evaluates a setting value of a circuit element of the transmission element or the reception element that has an influence on a receiving waveform based on a fluctuation of the window width detected by the window detection section, and changes the setting value of the circuit element of the transmission element or the reception element based on a result of the evaluation.

10. The circuit substrate according to claim 9, wherein the circuit element setting section adjusts a transmission characteristic by changing an internal termination resistance provided at a termination of the transmission path.

11. The circuit substrate according to claim 9, wherein
the reception element comprises a plurality of data receiving systems, and
the circuit element setting section adjusts a transmission characteristic by switching the data receiving systems based on a result of the evaluation.

12. The circuit substrate according to claim 9, wherein
the transmission element comprises a plurality of data transmission systems, and
the circuit element setting section adjusts a transmission characteristic by switching the plurality of data transmission systems based on a result of the evaluation.

13. The circuit substrate according to claim 9, wherein
the window detection section and the circuit element setting section are provided in a manner shared by a plurality of receiving systems provided in the reception element.

14. The circuit substrate according to claim 9, wherein
the circuit element setting section changes at least any one constant of an inductance, a capacitor, and a resistance that configure a power source filter of a power source that supplies power to a PLL of the transmission element or the reception element, thereby adjusting a jitter frequency resistance.

15. A transmission characteristic adjustment method that adjusts a transmission characteristic between a transmission element and a reception element with a transmission path interposed therebetween, the method comprising:
determining existence or non-existence of a difference with respect to confirmed data based on each phase of a multiphase clock;
detecting a window width in a time axis direction of receiving data based on a result of the determination and a phase of the multiphase clock; and
evaluating a setting value of a circuit element of the transmission element or the reception element that has an influence on a receiving waveform based on a fluctuation of the detected window width, and changing the setting value of the circuit element of the transmission element or the reception element based on a result of the evaluation.

16. The transmission characteristic adjustment method according to claim 15, the method comprising:
adjusting a transmission characteristic by changing an internal termination resistance provided at a termination of the transmission path.

17. The transmission characteristic adjustment method according to claim 15, wherein
the reception element comprises a plurality of data receiving systems,
the transmission characteristic adjustment method adjusting a transmission characteristic by switching the data receiving systems based on a result of the evaluation.

18. The transmission characteristic adjustment device according to claim 15, wherein
the transmission element comprises a plurality of data transmission systems,
the transmission characteristic adjustment method adjusting a transmission characteristic by switching the plurality of data transmission systems based on a result of the evaluation.

19. The transmission characteristic adjustment method according to claim 18, the method comprising:
modulating a control signal for setting to be transmitted to the transmission element side, and transmits the control signal in a manner superposing on a differential data transmission system in phase.

20. The transmission characteristic adjustment method according to claim 15, the method comprising:
changing at least any one constant of an inductance, a capacitor, and a resistance that configure a power source filter of a power source that supplies power to a PLL of the transmission element or the reception element, thereby adjusting a jitter frequency resistance.

* * * * *